May 1, 1956 H. BIRKENSTEIN, JR 2,743,956
MAGNETIC CUSHIONING SUPPORT FOR VEHICLES
Filed Dec. 11, 1952 2 Sheets-Sheet 1
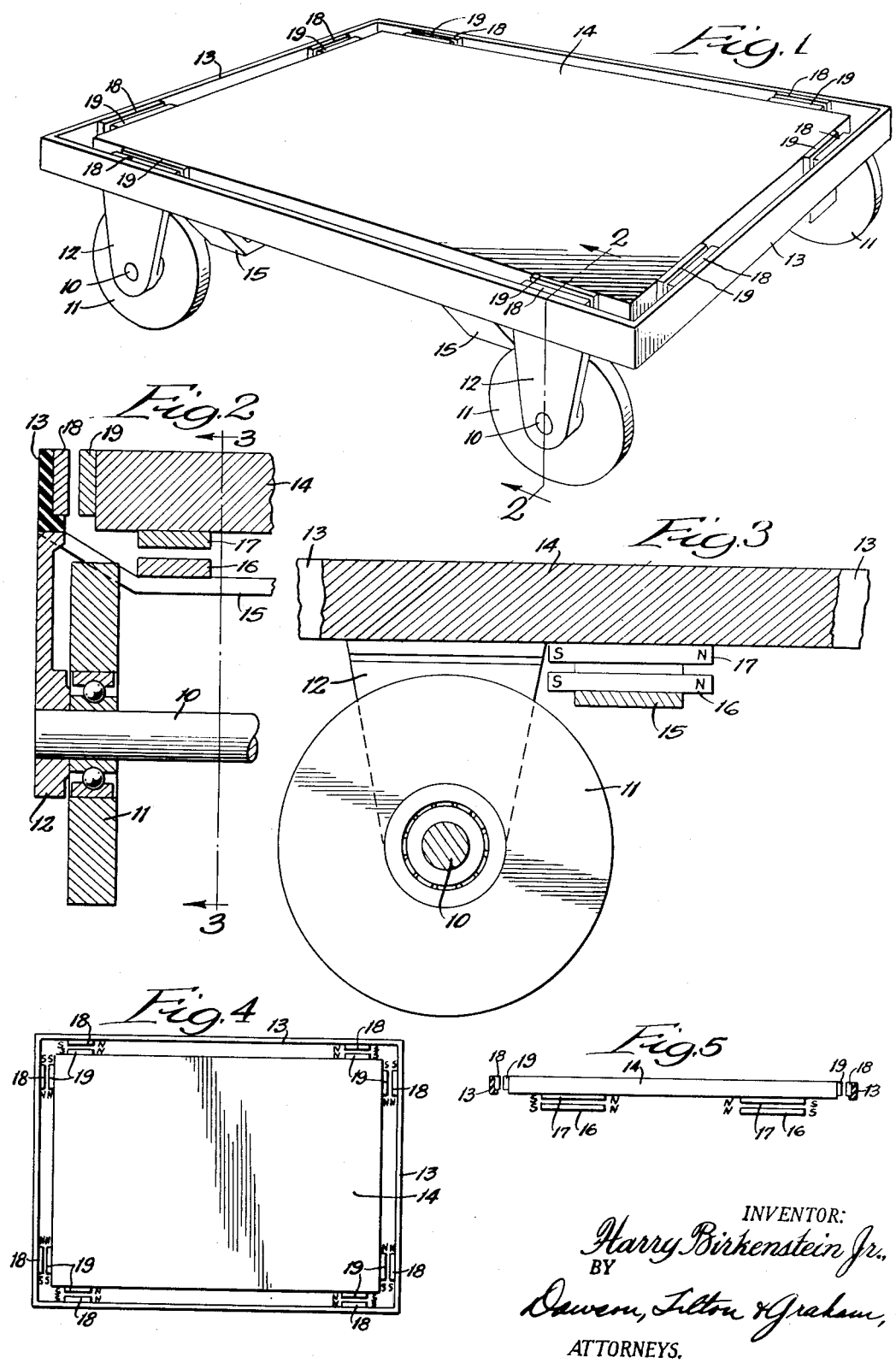
INVENTOR:
Harry Birkenstein Jr.,
BY
Dawson, Tilton & Graham,
ATTORNEYS.

May 1, 1956　　H. BIRKENSTEIN, JR　　2,743,956
MAGNETIC CUSHIONING SUPPORT FOR VEHICLES
Filed Dec. 11, 1952　　2 Sheets-Sheet 2
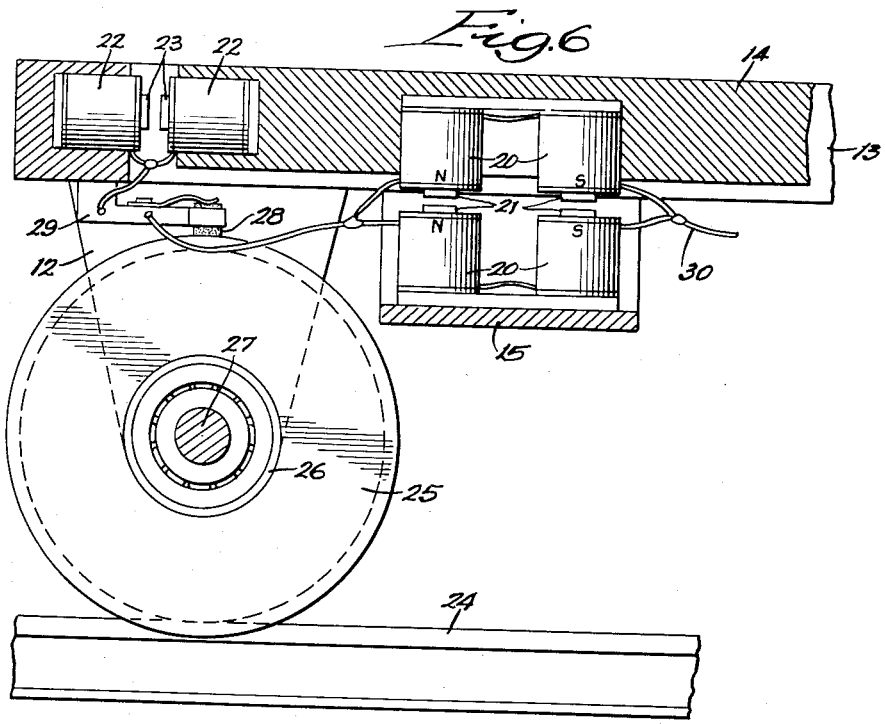
INVENTOR:
Harry Birkenstein Jr.,
BY
Dawson, Tilton & Graham
ATTORNEYS.

United States Patent Office 2,743,956
Patented May 1, 1956

2,743,956
MAGNETIC CUSHIONING SUPPORT FOR VEHICLES

Harry Birkenstein, Jr., Highland Park, Ill.

Application December 11, 1952, Serial No. 325,492

7 Claims. (Cl. 296—35)

This invention relates to a magnetic cushioning support for vehicles, and more particularly to a suspension for a body or upper structure upon a wheel support through the use of magnetic means.

An object of the invention is to provide a structure in which the repelling effect of magnet poles is employed to support an upper structure upon a wheel-supporting structure. A further object is to provide a suspension structure for supporting a platform or body upon a wheel-carrying frame through the employment of magnetic means. Yet another object is to provide in a vehicle magnetic means for supporting a platform or body by repelling magnetic means employed between the body and the wheel-carrying structure as well as between the sides of the body and said wheel-carrying structure. It is a further object to utilize in connection with a vehicle having wheel-carrying means and a body there-above, magnetic means consisting of permanent magnets or electromagnets with the arrangement such that the magnets on the different parts repel each other and tend to provide a floating body above the wheel-carrying structure. Other specific objects and advantages will appear as the specification proceeds.

The invention is shown, in an illustrative embodiment, by the accompanying drawings, in which—

Figure 1 is a perspective view of a vehicle equipped with suspension means embodying my invention; Fig. 2, an enlarged, detail, sectional view, the section being taken at line 2—2 of Fig. 1; Fig. 3, a sectional view, the section being taken as indicated at line 3—3 of Fig. 2; Fig. 4, a top plan view on a reduced scale; Fig. 5, a diagrammatic side view in elevation showing the magnets as employed in the structure shown in Fig. 4; and Fig. 6, a vertical sectional view showing a modification of my invention in which electromagnets are employed instead of natural or permanent magnets.

In the illustration given, in Figs. 1 to 5, inclusive, I provide axles 10 on which are mounted wheels 11. Mounted on the outside of the axles are upwardly-extending support members 12 on which is mounted a frame 13, which may be of insulating material. A floating platform or body 14 extends within the frame 11. I also provide a strap 15 which extends from the frame 12 inwardly and below the platform 14. Any number of straps 15 may be employed. In the illustration given, there is a strap 15 near each end of the vehicle.

To support the platform 14 in floating relation above the wheel support consisting of axle 10, side supports 12 and the frame 13, I employ a series of magnets having their similar poles together so that they tend to repel each other. On each strap 15 near each side of the vehicle is a magnet 16. At the bottom portion of the platform directly opposed to each magnet 16 is a magnet 17. The magnets 17 and 16 have their similar poles directly opposite each other, so that a repelling force is employed to support the platform 14 there-above. Similarly at the sides of the platform I provide magnet means for centering the platform within the frame structure 13. To the frame structure 13 are supported magnets 18, and to the inner side of the platform 14 opposite each magnet 18 is secured a magnet 19. The poles of the magnets are arranged as were magnets 16 and 17, so that they repel each other and thus center the platform within the frame 13. The arrangement of the various magnets 18 and 19 may be as illustrated in Figs. 4 and 5, so that the platform is centered evenly within the frame 13 and the straps 15 enable the platform to be maintained in a floating condition above the wheel support structure by the use of the magnets 16 and 17, as heretofore described.

For illustrative purposes, the vehicle has been shown as a simple structure with a minimum of parts thereon. It will be understood that the invention is applicable to all vehicles employed in which wheel supports are used and the body is supported there-above. It will be understood that the various structures may be light or heavy structures, depending upon the magnets employed, and may be in the form of automobiles, trucks, railroad vehicles, and propelled small vehicles and other types of vehicles in which a body is supported upon a wheel-carrying structure.

In the operation of the structure, the platform or body of the vehicle is maintained in a floating condition upon the lower frame structure which supports the wheels by the use of the vertical magnets and side magnets arranged so that each pair of magnets exerts a repelling force against each other. It is found that when the magnets are of such strength as to provide the desired supporting effect, the body or platform is resiliently supported and the shocks received by the wheel-supporting frame are not transmitted to the platform, thus giving a smooth, free floating effect to the body or platform.

In the structure shown in Fig. 6, I show the use of electromagnets which operate in the same manner as the permanent magnets but have usually greater supporting effect. The electromagnets are of the usual type and have charged opposite poles 21 which are the same and therefore exert a repelling force. The laterally-disposed electromagnets 22 are of similar construction and have like opposed poles 23. Current may be supplied to the electromagnets in any suitable way. In the illustration given, the current is supplied through the rails 24 and through the wheels 25 which have an insulation 26 about the inner wheel structure carried by the axle 27. A brush 28 thus conveys the current from the wheel to a conductor 29 furnishing current to the electromagnets 20 and 22. From the magnets, the current flows through line 30 to the opposite side of the vehicle, where the current passes downwardly through an opposite wheel into the opposite negatively-charged rail. Since such structure is well known in the art, a detailed description is herein unnecessary. It will be understood that the current may be furnished to the electromagnets from a variety of sources. The operation of the structure shown in Fig. 6 in supporting the platform in a floating condition between the magnets is the same as that described with respect to the structure shown in Figs. 1 to 5, inclusive.

The magnets may be used in multiple rather than single units and it is preferred to employ at least four magnets in a set, as indicated in Fig. 5, showing the position of the terminal charges of each magnet.

While in the foregoing specification, I have set forth a specific structure in considerable detail for the purpose of illustrating embodiments of the invention, it will be understood that such details of structure may be varied widely by those skilled in the art without departing from the spirit of my invention.

I claim:

1. In a vehicle structure of the character described, a plurality of wheels for said vehicle adapted to move it over a surface supporting the same, a perimetric frame carried by said wheels and being supported thereby, a vehicle body mounted within said perimetric frame and being spaced from the sides and ends thereof, means for supporting said body within said frame for generally free horizontal movement with respect thereto, and a plurality of opposed pairs of horizontally aligned magnets along the sides and ends of said perimetric frame, one magnet of each pair being carried by said body and the other by said frame, the repelling forces developed between the magnets of each pair being operative to floatingly maintain said body in a predetermined horizontal relation with respect to said frame.

2. In a vehicle structure of the character described, a plurality of wheels for said vehicle adapted to move it over a surface supporting the same, a frame carried by said wheels and being supported thereby, a vehicle body carried by said frame and being movable vertically with respect thereto, a plurality of opposed pairs of vertically aligned magnets, one magnet of each pair being carried by said frame and the other by said body, the repelling forces developed between the magnets of each pair being operative to floatingly support said body in a generally predetermined vertical relation with respect to said frame, and means for maintaining said body in a relationship with said frame such that the magnets carried respectively thereby are maintained in substantial vertical alignment.

3. In a vehicle structure, a plurality of wheels for said vehicle adapted to move it over a surface supporting the same, a perimetric frame carried by said wheels and being supported thereby, a vehicle body mounted within said perimetric frame and being spaced from the sides and ends thereof, a plurality of opposed pairs of horizontally aligned magnets along the sides and ends of said perimetric frame, one magnet of each pair being carried by said body and the other by said frame, the repelling forces developed between the magnets of each pair being operative to floatingly maintain said body in a predetermined horizontal relation with respect to said frame, and a second group of magnets comprising a plurality of opposed pairs of vertically aligned magnets, one magnet of each pair being carried by said frame and the other by said body, the repelling forces developed between the magnets of each pair being operative to floatingly support said body in a generally predetermined vertical relation with respect to said frame.

4. The structure of claim 3 in which all of said magnets are electromagnets.

5. The structure of claim 3 in which all of said magnets are permanent magnets.

6. In a vehicle structure equipped with wheels and wheel supports and a body there-above, electromagnets on said wheel supports and body with their poles arranged in repelling relation and being in substantial vertical alignment to support said body in floating condition above said wheel supports, means for supplying current to said electromagnets, and means for maintaining said body in a relationship with said wheel support so that the magnets carried respectively thereby remain in substantially vertical alignment.

7. The structure of claim 6, in which electromagnets are supported upon said wheel supports adjacent the sides of said body and electromagnets are supported on the sides of said body with the poles thereof in repelling relation to the poles of said wheel support magnets, said electromagnets supported adjacent the sides of said body and on the sides thereof being arranged in horizontally-aligned pairs and selected to maintain said body and wheel supports in a predetermined relationship.

References Cited in the file of this patent

UNITED STATES PATENTS

| | | |
|---|---|---|
| 699,709 | Pulbrook | May 13, 1902 |
| 1,980,956 | Okey | Nov. 13, 1934 |
| 2,279,076 | Sutton | Apr. 7, 1942 |
| 2,340,781 | Wagner | Feb. 1, 1944 |
| 2,560,260 | Sturtevant et al. | July 10, 1951 |

OTHER REFERENCES

11390, "Wobbly Bar With Cobalt Magnets," Chicago Apparatus Co. publication, page 148. Prior to May 1, 1950. (Copy in 46-45 uxr.)